United States Patent [19]

Beer

[11] Patent Number: 5,755,840
[45] Date of Patent: May 26, 1998

US005755840A

[54] METHOD FOR PROVIDING OXYGEN IN GAS PROCESS

[75] Inventor: Gary L. Beer, Plano, Tex.

[73] Assignee: Atlantic Richfield Company, Los Angeles, Calif.

[21] Appl. No.: 692,424

[22] Filed: Aug. 5, 1996

[51] Int. Cl.[6] .............. C01B 3/32; B01D 53/02; B01J 8/02
[52] U.S. Cl. .............. 48/127.3; 48/127.7; 48/198.1; 48/198.5; 96/144; 422/189
[58] Field of Search .............. 48/127.3, 127.7, 48/198.1, 198.5; 422/189; 96/144

[56] References Cited

U.S. PATENT DOCUMENTS

| 2,500,533 | 3/1950 | Friedman et al. | 518/715 |
|---|---|---|---|
| 2,552,308 | 5/1951 | Buchmann et al. | 422/189 |
| 4,453,952 | 6/1984 | Izumi et al. | 55/68 |
| 4,579,985 | 4/1986 | Minderhoud et al. | 514/312 |
| 4,617,182 | 10/1986 | Brown et al. | 423/579 |
| 4,973,453 | 11/1990 | Agee | 422/190 |
| 5,208,335 | 5/1993 | Ramprasad et al. | 544/225 |
| 5,294,418 | 3/1994 | Ramprasad et al. | 423/219 |
| 5,658,371 | 8/1997 | Smolarek et al. | 95/101 |

OTHER PUBLICATIONS

"Solid State Lithium Cyanocobaltates with a High Capacity for Reversible Dioxygen"; Ramprasad et. al; J. Am. Chem. Soc.; vol. 117, No. 43; 1995; pp. 10694–10701.

"High–Capacity Oxygen Sorbents Show Promise in Air Separation Applications"; C & EN; Feb. 5, 1996, pp. 35–36.

*Primary Examiner*—Tae Yoon
*Attorney, Agent, or Firm*—Drude Faulconer

[57] ABSTRACT

A process for providing oxygen to a feed gas wherein the oxygen is first absorbed from an oxygen-containing gas (e.g. air) and then desorbed into the feed gas (e.g. natural gas). The oxygen is adsorbed from air by passing the air in contact with an oxygen-sorbent material (e.g. a solid-state, lithium cyanocobaltate) until the sorbent-material is substantially saturated after which the feed gas is passed in contact with the sorbent material to desorb the oxygen into the feed gas.

13 Claims, 1 Drawing Sheet

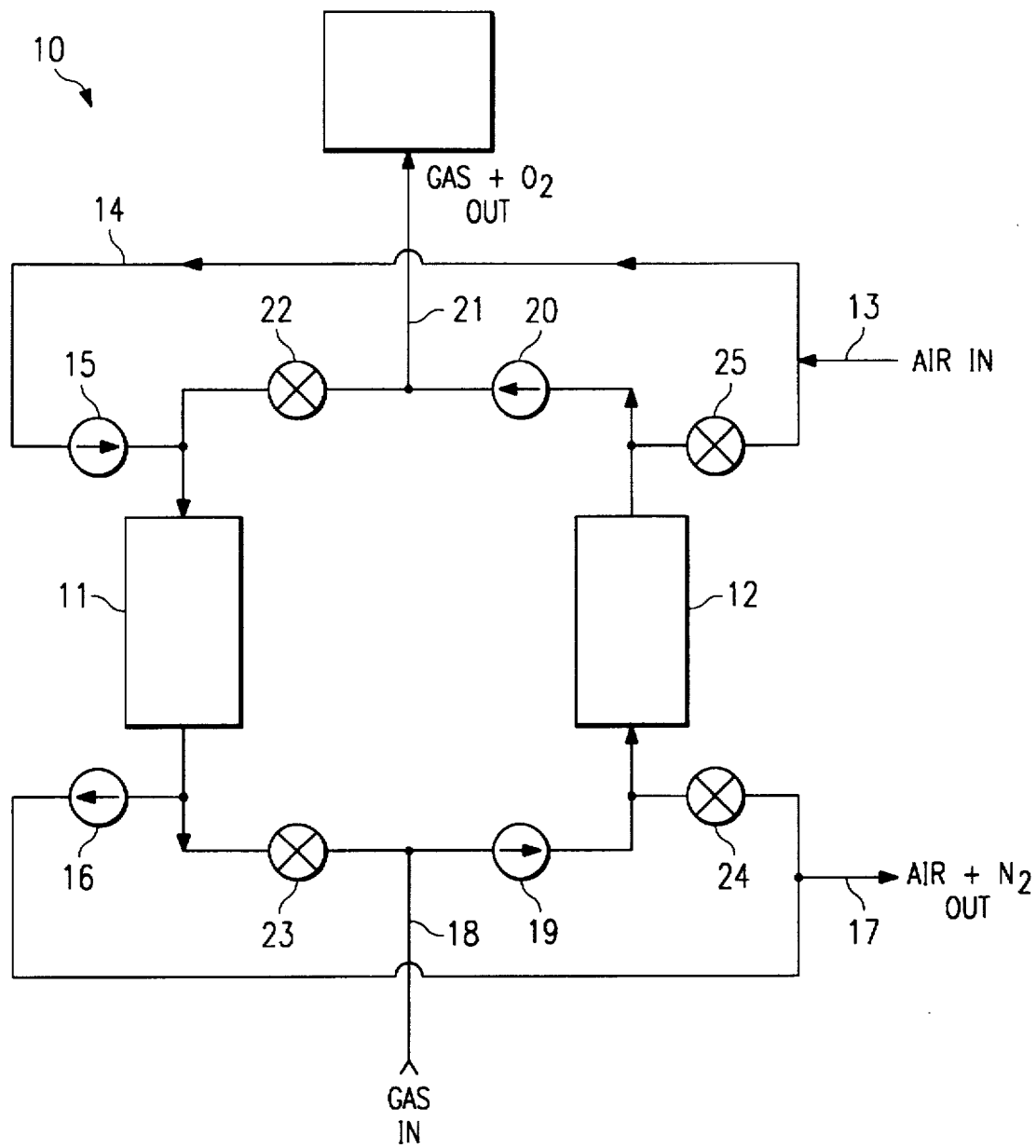

5,755,840

METHOD FOR PROVIDING OXYGEN IN GAS PROCESS

DESCRIPTION

1. Technical Field

The present invention relates to a process for providing oxygen in a gas process and in one of its aspects relates to a process wherein oxygen is absorbed from air and then desorbed into a gas (e.g. natural gas) which, in turn, is then converted to into "syngas" (i.e. hydrogen and carbon monoxide).

2. Background Art

There are various processes wherein oxygen is added to a gas before the gas is reacted to form a particular product. An example of such a process is one in which a feed hydrocarbon gas (e.g. surplus natural gas) is converted to a liquid (e.g. methanol, gasolines, distillates, etc.) for varying uses or to aid in transporting the gas/product to distant markets. Typically, the feed gas is mixed with an oxygen-containing gas before it is flowed through an Autothermal Reformer, e.g. a partial oxidation reformer, where it is converted to a synthesis gas ("syngas", i.e. a gas comprised of carbon monoxide (CO) and hydrogen ($H_2$)).

The syngas is then fed to a Fischer-Tropsch type of reactor which is loaded with an appropriate catalyst which, in turn, converts the syngas to a desired product (e.g. methanol, gasolines, distillates, etc.) depending on the catalyst and the operating conditions within the reactor. Such processes are well-known; e.g. see U.S. Pat. Nos. 2,500,533; 2,552,308; 4,579,985; and 4,973,453.

Ideally, the oxygen-containing gas used in this process is as high of purity oxygen gas as possible (e. g. substantially pure oxygen) but, as will be recognized, this greatly increases the costs involved in the process even, in most cases, to the point of making the process economically prohibitive. Accordingly, now most processes of this type propose the use of air as the source for the required oxygen; e.g. see above mentioned US Patents.

While the use of air solves some problems (i.e. much more economical) in the process, its use creates a different problem in that a much larger volume of air is needed to supply the required amount of oxygen for the process. Since air is approximately 80% nitrogen, large amounts of unwanted nitrogen are introduced into the process which have to be continuously handled and disposed of as the process is being carried out.

Accordingly, the advantages of being able to use air as the source of oxygen in such processes without having to handle the large volumes of nitrogen associated therewith, are obvious.

SUMMARY OF THE INVENTION

The present invention provides a process for providing oxygen to a feed gas wherein the oxygen is first absorbed from an oxygen-containing gas (e.g. air) and then is desorbed into the feed gas (e.g. natural gas). The oxygen is adsorbed from the air by passing the air in contact with an oxygen-sorbent material (e.g. a solid-state, lithium cyanocobaltate) until the sorbent-material is substantially saturated and then the feed gas is passed in contact with the sorbent material to desorb the oxygen into the feed gas.

More specifically, the present invention uses a system which is comprised of one or more absorbing columns, each of which contain a reversible, oxygen-absorbing material; solid-state lithium cyanocobaltates. The oxygen-containing gas (e.g. air) is flowed in contact with the oxgyen sorbent in a first column whereby oxygen from the air is adsorbed and is weakly held on the surface of the sorbent. The remaining gases (e.g. nitrogen, etc.) and any "unadsorbed" air pass on through the first column for disposal, e.g. vented to the atmosphere.

In the present invention, the sorbent in a column removes oxygen from air until the sorbent is substantially saturated with oxygen. The air is then switched to a second column and the first column is "regenerated" by passing a feed through the first column. Since the feed gas contains very little, if any oxygen, the previously-adsorbed oxygen now desorbs from the sorbent into the feed gas at a high rate even when the first column is operated at or about the same pressure and temperature as those present during the absorption cycle.

When the sorbent in the first column is substantially depleted of oxygen (i.e. regenerated), the flows of air and gas to the respective columns are reversed. That is, air is passed through the regenerated column while the feed gas is passed through the newly-saturated column. This cycling of the columns is continued at timed intervals whereby oxygen is being continuously absorbed from the air in one column while oxygen is being desorbed into the feed gas in the second column.

The feed gas (e.g. methane), which now contains substantially pure oxygen, passes out of system while the large volumes of the unwanted nitrogen, originally present in the "adsorbed" air, is expelled from the system where it can simply be vented to the atmosphere or otherwised used or disposed of. The stream of feed gas/oxygen is passed to a reactor to be further process (e.g. converted to "syngas").

BRIEF DESCRIPTION OF THE DRAWING

The actual construction, operation, and apparent advantages of the present invention will be better understood by referring to the FIGURE which is not necessarily to scale and which is a schematic view of a system which can be used in carrying out the present invention.

BEST KNOWN MODE FOR CARRYING OUT THE INVENTION

In certain processes, oxygen is added to a feed gas before the feed gas is reacted to form a particular product. For example, in the conversion of light hydrocarbon gases (natural gas) to liquids (e.g. methanol,gasolines, distillates, etc.), oxygen is added to the feed gas before it is passed through a partical oxidation reformer to produce "syngas" (i.e. hydrogen and carbon monoxide) which, in turn, is then converted to the desired liquid product. The use of pure oxygen for this purpose is usually too expensive to make the process commercial so large amounts of air are often used as the source of the required oxygen. This, unfortunately however, introduces large volumes of unwanted nitrogen into the process which have to be handled along with the syngas. In accordance with the present invention, air is used as the source of the required oxygen for the process while eliminating the need for handling the large volumes of nitrogen normally associated with air during the syngas conversion.

Referring more particularly to the drawings, the FIGURE discloses a schematical view of one system 10 which can be used in carrying out the process in accordance with the present invention. System 10 is basically comprised of one or more absorbing columns, preferably at least one pair of columns 11, 12 which are manifolded together for a purpose described below. Each column contains a reversible, oxygen-absorbing material; i.e. a material which adsorbs oxygen from a first gas (e.g. air) and then desorbs the oxygen when contacted by a second gas (e.g. natural gas). This material can be any which is capable of reversibly binding molecular oxygen on its surface; e.g. solid-state lithium cyanocobaltates such as those discovered by Air Products & Chemicals, Allentown, PA. For an excellent description and discussion of the type of oxygen-sorbents which can be used in the present invention, see "Solid State Lithium Cyanocobaltates with a High Capacity for Reversible Dioxygen Binding: Synthesis, Reactivity, and Structures", D.Ramprasad et al, J.Am. Chem Soc., Vol. 117, No. 43, 1995, pps. 10694–10701.

An oxygen-containing gas (e.g. air) is flowed into apparatus 10 through inlet 13, line 14, open valve 15, and through first column 11. As the air contacts the oxgyen sorbent in column 11, oxygen from the air is adsorbed onto and is weakly held on the surface of the sorbent. The remaining gases (e.g. nitrogen, etc.) and any "unadsorbed" air pass through column 11, open valve 16, and out outlet 17 for use or disposal, e.g. vented to the atmosphere.

As will be understood, solids such as the sorbents in columns 11 and 12 adsorb and weakly hold gases (e.q. oxygen) on their surfaces. The rate of adsorption depends on the concentration of the gas in the vapor phase in relation to the limiting equilibrium amount which varies with the particular gas and sorbent material. Gas concentrations can be measured as partial pressures which indicate the mole fraction of the particular gas(es) times the absolute pressure. As the adsorbed gas molecules approaches equilibrium with the gas molecules in vapor phase, the adsorption process slows down and stops.

When no more gas can be adsorbed, the adsorbent is said to be "saturated" with the gas at feed conditions. If the composition of the vapor phase (e.g. regenerating gas) now changes to a one containing very little of the adsorbed gas, the adsorbed gas will then desorb from the sorbent into the new vapor phase. As long as the vapor phase contains less gas than the equilibrium amount, the gas will continue to desorb into the vapor phase.

In the present invention, the sorbent in a column removes oxygen from air until the sorbent is substantially saturated with oxygen. Referring again to the FIGURE, column 12 has already been saturated with oxygen during a prior cycle and is shown as being "regenerated" as column 11 is undergoing adsorption. The saturated sorbent in column 12 is swept with a feed or second gas (e.g. natural gas/methane) by passing the methane through inlet 18, open valve 19, column 12, open valve 20, and out outlet line 21. Since the original methane stream contains very little, if any oxygen, the previously-adsorbed oxygen now desorbs from the sorbent into the methane at a high rate even when column 12 is at about the same pressure and temperature as those which existed during absorption.

As flow of feed gas continues through the saturated column, equilibrium is again approached. The concentration of oxygen at this point produces a relatively high partial pressure in the feed gas as the stream leaves column 12. The partial pressure of oxygen can be further increased in the methane stream, hence providing a higher-concentration of oxygen in the stream, by operating the desorbing column 12 at a lower pressure than that at which the adsorbing column is operated.

When the sorbent in column 12 is substantially depleted of oxygen (i.e. regenerated), the flow of air and gas to the respective columns are reversed by opening previously closed-valves 22–25 and closing previously open-valves 15, 16, 19, and 20. That is, air is passed through the regenerated column 12 while newly-saturated column 11 is regenerated by passing the feed gas therethrough. As will be understood, a purge gas (e.g. inert gas such as nitrogen) can be used to purge the feed gas from the regenerated column before a new absorbing cycle is commenced. The cycling of the columns is continued at timed intervals by merely reversing the positions of the respective valves whereby oxygen is being continuously absorbed from the air in one column while oxygen is being desorbed into the feed gas in the second column.

The feed gas (e.g. methane), which now contains substantially pure oxygen, passes out of system 10 through line 21 and into a reactor 30 while the large volumes of the unwanted nitrogen, originally present in the "adsorbed"0 air, is expelled from the system 10 through line 17 where it can simply be vented to the atmosphere or otherwised used or disposed of. Reactor 30 is one wherein the feed aas and oxygen is further processed to produce a desired product. For example, in a process where a hydrocarbon feed gas (e.g. methane) is to be converted to a liquid, reactor 30 is an Autothermal Reformer, e.g. a partial oxidation reformer, where the feed gas/oxygen is converted to a synthesis gas ("syngas", i.e. a gas comprised of carbon monoxide (CO) and hydrogen ($H_2$)).

As will be understood, the syngas is then fed to a second reactor (e.g. a Fischer-Tropsch type of reactor, not shown) which is loaded with an appropriate catalyst which, in turn, converts the syngas to a desired product (e.g. methanol, gasolines, distillates, etc.) depending on the catalyst and the operating conditions within the second reactor; e.g. see U.S. Pat. Nos. 2,500,533; 2,552,308; 4,579,985; and 4,973,453.

What is claimed is:

1. A process for providing oxygen to a feed gas, said process comprising:

adsorbing oxygen from an oxygen-containing gas by an oxygen-sorbent material; and desorbing said oxygen into said feed gas.

2. The process of claim 1 wherein said oxygen-containing gas is air and said feed gas is natural gas.

3. The process of claim 2 wherein said oxygen is adsorbed from said air by passing said air in contact with the oxygen-sorbent material; and said oxygen is desorbed into said feed gas by passing said feed gas in contact with said oxygen-sorbent material after said oxygen has been adsorbed thereon.

4. The process of claim 3 wherein said oxygen-sorbent material is a solid-state, lithium cyanocobaltate.

5. The process of claim 3 wherein said absorption of said oxygen from said air and said desorption of said oxygen into said feed gas is carried out at substantially the same pressures.

6. The process of claim 3 wherein said desorption of said oxygen into said feed gas is carried out at lower pressure than the pressure at which said oxygen is adsorbed from said air.

7. A process for providing oxygen to a feed gas, said process comprising:

passing air through a first column containing an oxygen-sorbent material to adsorb oxygen from said air;

ceasing the flow of air through said first column when said oxygen-sorbent material becomes substantially saturated with oxygen; and passing said feed gas through said first column to desorb said oxygen from said oxygen-sorbent material into said feed gas.

8. The process of claim 7 wherein said feed gas is natural gas.

9. The process of claim 7 wherein said oxygen-sorbent material is a solid-state, lithium cyanocobaltate.

10. The process of claim 7 wherein said absorption of said oxygen from said air and said desorption of said oxygen into said feed gas is carried out at substantially the same pressures within said first column.

11. The process of claim 7 wherein said desorption of said oxygen into said feed gas is carried out at lower pressure within said first column than the pressure at which said oxygen is adsorbed from said air within said column.

12. The process of claim 7 including:

switching the flow of air to a second column having an oxygen-sorbent material therein when said oxygen-sorbent material in said first column becomes substantially saturated.

13. The process of claim 7 including:

purging said first column of said feed gas with a purge gas after said oxygen has been desorbed from first column.

* * * * *